(12) United States Patent
Gaudreau et al.

(10) Patent No.: US 9,718,531 B2
(45) Date of Patent: Aug. 1, 2017

(54) AIRCRAFT DRAINAGE SYSTEM

(71) Applicant: Bombardier Inc., Dorval (CA)

(72) Inventors: Jean-Guy Gaudreau, St-Bernadin (CA); Philippe Désy, Prévost (CA); Guillaume Sourbes, Ville Mont-Royal (CA)

(73) Assignee: BOMBARDIER INC., Dorval (CA)

( * ) Notice: Subject to any disclaimer, the term of this patent is extended or adjusted under 35 U.S.C. 154(b) by 150 days.

(21) Appl. No.: 14/770,588

(22) PCT Filed: Feb. 24, 2014

(86) PCT No.: PCT/IB2014/000193
§ 371 (c)(1),
(2) Date: Aug. 26, 2015

(87) PCT Pub. No.: WO2014/135938
PCT Pub. Date: Sep. 12, 2014

(65) Prior Publication Data
US 2016/0009358 A1    Jan. 14, 2016

Related U.S. Application Data

(60) Provisional application No. 61/773,298, filed on Mar. 6, 2013.

(51) Int. Cl.
*B64C 1/14* (2006.01)
*B64D 41/00* (2006.01)

(52) U.S. Cl.
CPC ............ *B64C 1/1453* (2013.01); *B64D 41/00* (2013.01)

(58) Field of Classification Search
CPC ............ B64C 1/1453; B64D 2041/002; B64D 41/00; F16L 5/02
(Continued)

(56) References Cited

U.S. PATENT DOCUMENTS 2,814,931 A * 12/1957 Johnson .................. F02C 7/232
60/39.094
4,437,487 A * 3/1984 Marmon .................. F16K 15/18
137/322
(Continued)

FOREIGN PATENT DOCUMENTS

CN          1088171       6/1994
DE     102008037142 A1    2/2010
(Continued)

OTHER PUBLICATIONS

Google, "seal definition", https://www.google.com/search?q=seal+definition, accessed Mar. 30, 2017.*
(Continued)

*Primary Examiner* — Tien Dinh
*Assistant Examiner* — Alexander V Giczy
(74) *Attorney, Agent, or Firm* — Norton Rose Fulbright Canada LLP

(57) ABSTRACT

A drain for expelling fluids from an interior of an aircraft to an exterior of the aircraft, the drain including a drain tube disposed at the interior of the aircraft having a first end disposed in fluid communication with an aircraft equipment to be drained and an opposite second end, wherein the drain tube terminates at the second end at a location within the interior of the aircraft, a seal which extends between the second end of the drain tube and an outer skin of the aircraft, delimiting a drainage cavity, and a drainage pathway extending from the cavity through the outer skin to the exterior of the aircraft.

19 Claims, 11 Drawing Sheets

(58) Field of Classification Search
USPC ........................................................ 222/108
See application file for complete search history.

(56) References Cited

U.S. PATENT DOCUMENTS

| | | | | |
|---|---|---|---|---|
| 5,104,069 | A * | 4/1992 | Reising | B64D 1/16 244/129.1 |
| 5,259,185 | A * | 11/1993 | Peterson | F02C 7/222 285/14 |
| 5,290,996 | A | 3/1994 | Giamati | |
| 5,996,938 | A * | 12/1999 | Simonetti | B64C 1/1453 244/129.1 |
| 6,578,361 | B1 * | 6/2003 | Higginbotham | F01D 5/005 60/39.094 |
| 6,776,183 | B1 * | 8/2004 | Brooker | B64C 1/1453 137/216 |
| 7,546,981 | B2 | 6/2009 | Hoffjann et al. | |
| 2004/0146339 | A1 * | 7/2004 | Lutzer | B64C 1/1453 403/226 |
| 2006/0273224 | A1 | 12/2006 | Hoffjann et al. | |
| 2008/0181770 | A1 * | 7/2008 | Russell | B64D 29/00 415/182.1 |
| 2010/0032525 | A1 | 2/2010 | Piesker | |
| 2011/0121137 | A1 | 5/2011 | Sandiford | |
| 2013/0327059 | A1 * | 12/2013 | Richardson | B64C 1/1453 60/797 |
| 2014/0084107 | A1 * | 3/2014 | Lopez Fernandez | B64C 1/1453 244/58 |
| 2014/0158208 | A1 * | 6/2014 | Becks | B64C 1/1453 137/1 |
| 2014/0242896 | A1 * | 8/2014 | Plessner | B64C 1/1453 454/71 |

FOREIGN PATENT DOCUMENTS

| | | | | |
|---|---|---|---|---|
| ES | WO 2012101313 | A2 * | 8/2012 | ........... B64C 1/1453 |
| FR | 2907099 | A1 * | 4/2008 | ........... B64C 1/1453 |
| WO | 0236426 | A2 | 5/2002 | |

OTHER PUBLICATIONS

Chinese Patent Office; Office Action dated Nov. 30, 2016 re: Chinese Patent Application No. 201480011839.3.
Chinese Patent Office; Office Action dated Apr. 5, 2016 re: Chinese Patent Application No. 201480011839.3.
English abstract of CN1088171(A) from http://worldwide.espacenet.com.
PCT International Search Report and Written Opinion dated Jun. 17, 2014 re: International Application No. PCT/IB2014/000193.

* cited by examiner

US 9,718,531 B2

AIRCRAFT DRAINAGE SYSTEM

CROSS REFERENCE TO RELATED APPLICATION AND CLAIM OF PRIORITY

This application is a national phase application under 35 U.S.C. 371 of International Patent Application No. PCT/IB2014/000193 filed on Feb. 24, 2014, which claims priority from U.S. provisional patent application No. 61/773,298 filed on Mar. 6, 2013, the entire contents of which are hereby incorporated by reference.

TECHNICAL FIELD

The invention relates to a system for draining fluids from an aircraft and, more particularly, to a system for expelling leaked or otherwise unwanted fluid from aircraft components to an exterior of the aircraft where the system includes protection against lightning direct strike and attachment.

RELATED ART

Certain aircraft systems and components include drain systems which collect and expel 10 fluids which may leak from the systems or components or which otherwise accumulate in a cavity within the aircraft. The fluids may be flammable liquids such as fuel or oil or non-flammable fluids such as water. The drainage system directs such fluids to the exterior of the aircraft where the fluid is released into the atmosphere.

Traditional drain systems typically consist of one or more drain tubes connected at one end with the aircraft system or component that is susceptible to leakage, a body which extends between the first end and an outer skin of the aircraft, and a second opposite end which extends through the outer skin and protrudes slightly from the aircraft. FIG. 1, for example, shows a schematic cross-section view of a portion of a conventional drainage system including a plurality of drain tubes 10, 12, 14, and 16 each having first ends (not shown) disposed in fluid communication with an aircraft system or component. The drain tubes 10, 12, 14, and 16 further include respective second ends 18, 20, 22, and 24 which each extend through an outer skin 26 of the aircraft to an exterior where the drain tubes 10, 12, 14, and 16 terminate. The seconds ends 18, 20, 22, and 24 of the drain tubes 10, 12, 14, and 16 typically extend about 0.65 inches or more beyond the aircraft outer skin 26. The drainage system of FIG. 1 is for an auxiliary power unit (APU) disposed in a tail cone of the aircraft. The drain tubes 10, 12, 14, and 16 are respectively connected to the following APU components: an inlet plenum drain; a fuel control drain; a bearing seal witness drain; and a turbine plenum drain. In use, any excess fluids which leak or are otherwise discharged from these various APU components are driven by gravity through the drain tubes 10, 12, 14, and 16 to the second ends thereof 18, 20, 22, and 24 where the fluids pass through the outer skin 26 are expelled into the atmosphere.

As mentioned, each of the drain tubes 10, 12, 14, and 16 extend from the outer aircraft skin 26 about 0.65 inches or more. That is, the drain tubes protrude into the atmosphere surrounding the aircraft. Additionally, the drain tubes, or at least the second protruding ends thereof, may be composed of a conductive material. As such, the protruding drain tubes may be susceptible to lightning strike and attachment. This is particularly the case with regard to the APU drain tubes illustrated in FIG. 1 which are traditionally disposed on the lower angled surface of the aircraft composite tail cone at the APU access door skin. This is considered to be "zone 2A—swept stroke" and thus lightning effects must be considered.

Accordingly, there is a need for an aircraft drainage system which allows for expulsion of leaked or discharged fluids while at the same time minimizing lightning damage potential.

BRIEF SUMMARY

The disclosure provides a drain for expelling fluids from an interior of an aircraft to an exterior of the aircraft, the drain including a drain tube disposed at the interior of the aircraft having a first end disposed in fluid communication with an aircraft equipment to be drained and an opposite second end, wherein the drain tube terminates at the second end at a location within the interior of the aircraft, a seal which extends between the second end of the drain tube and an outer skin of the aircraft, delimiting a drainage cavity, and a drainage pathway extending from the cavity through the outer skin to the exterior of the aircraft.

The disclosure further provides a drainage system for an aircraft auxiliary power unit disposed in a tail cone of the aircraft, the drainage system including a drain tube having a first end disposed in fluid communication with the APU and configured to receive excess fluid from the APU, the drain tube further including an opposite second end, wherein the drain tube terminates at the second end at a location within the tail cone above a lower angled outer skin of the tail cone, a seal which surrounds and seals the second end of the drain tube, wherein the seal extends downwardly to the angled outer skin of the tail cone and seals thereagainst, delimiting a hermetically sealed drainage cavity, a perforation extending through the angled outer skin to an exterior of the aircraft, and a flange disposed on the outer skin at the exterior of the aircraft and extending over the perforation, the flange being configured to direct drained fluid at the exterior of the aircraft and to cover the perforation at the exterior of the aircraft to prevent lightning from entering the cavity, wherein the perforation is disposed in the angled outer skin at a relative low point of the cavity to facilitate gravity fed drainage of the fluid therethrough.

The above described and other features are exemplified by the following detailed description.

DETAILED DESCRIPTION

Figure 1:
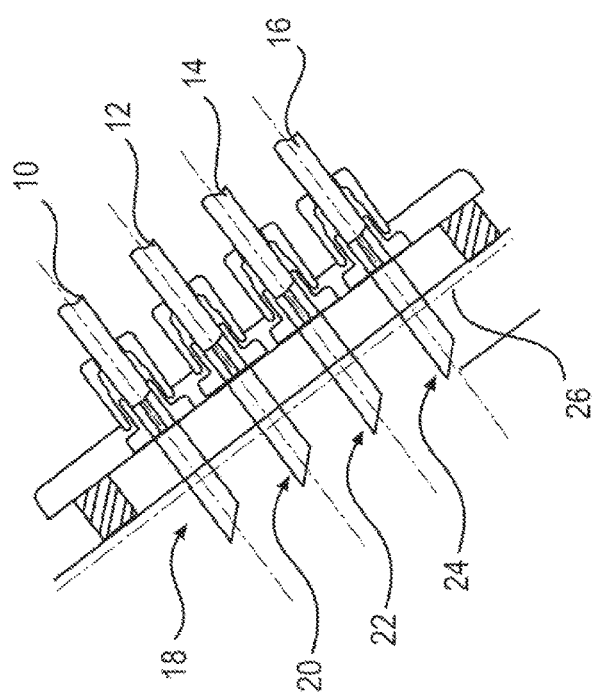
FIG. 1 is a schematic cross-sectional view of a conventional aircraft drain arrangement.
Figure 2:
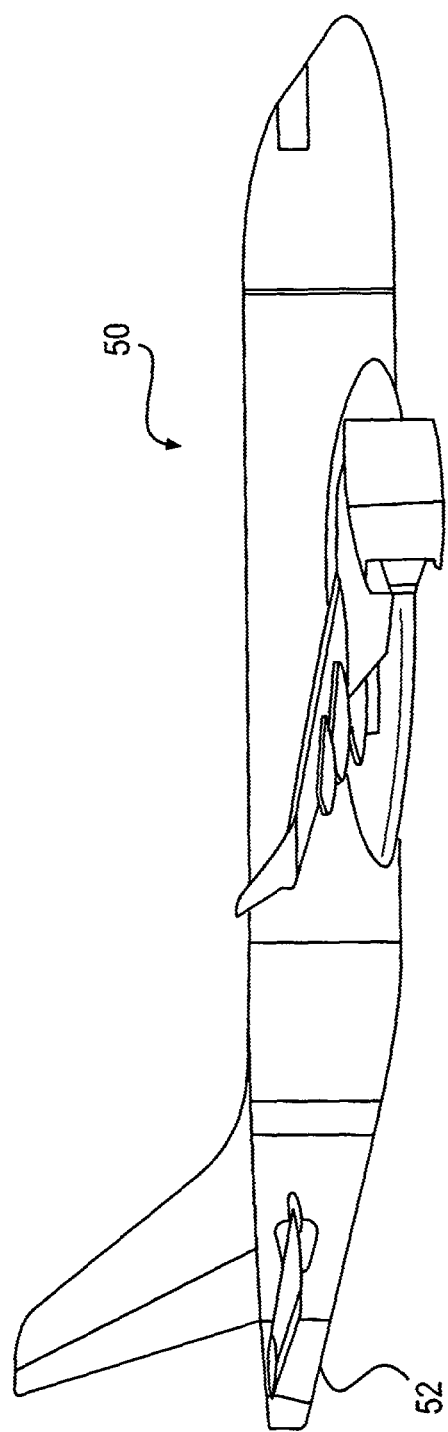
FIG. 2 is a side view of an aircraft.
Figure 3:
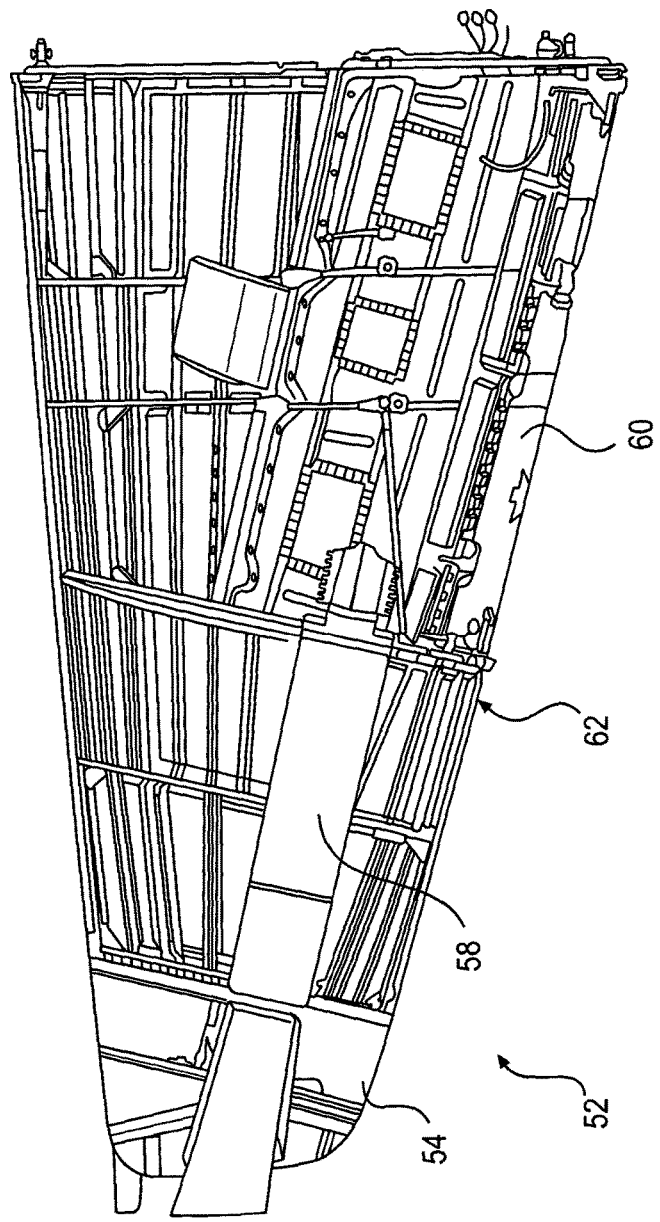
FIG. 3 is a partial cross section view of a tail cone of the aircraft of FIG. 2.

FIG. 2 shows an exemplary aircraft 50 having a tail cone 52. An auxiliary power unit (APU) is disposed within the tail cone 52. FIG. 3 shows an enlarged cross-sectional partial view of the tail cone 52. The tail cone 52 includes an outer skin 54 which extends over the internal aircraft structure which houses the APU 58. An APU access door 60 is disposed on a lower side 62 of the tail cone 52. The access door 60 is movable between a closed position (as shown) in which the APU 58 and an interior of the tail cone 52 are inaccessible, and an open position (not shown) in which the door 60 is positioned away from the tail cone such that the APU and tail cone interior may be accessed. The door 60 is typically hinged such that it pivots between the open and closed positions. The lower side 62 of the tail cone 52 is angled with a low point disposed toward the aircraft's front such that the lower side 62 angles upwardly in the aft direction. Thus, the outer skin of the tail cone 52, including the APU access door 60, correspondingly angles upwardly in the aft direction such that a low point is located toward the aircraft front.

Figure 4:
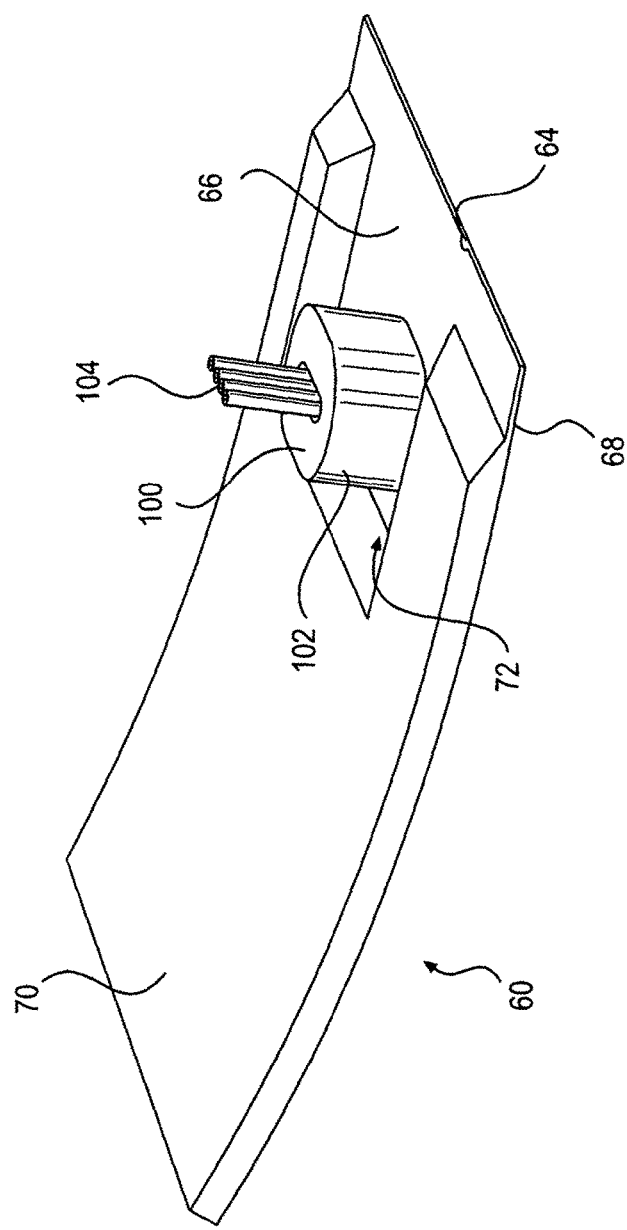
FIG. 4 is perspective view of an access door of the tail cone of FIG. 3.

FIG. 4 shows the APU access door 60 as including an outer skin 64 having an inner side 66 and an outer side 68. The inner side 66 of the skin 64 is disposed within the tail cone interior; the outer side 68 is on the exterior of the aircraft and is exposed to the atmosphere. A honeycomb structure 70 is disposed on the inner side 66 of the skin 64 and lends strength and reinforcement to the door 60. The honeycomb structure 70 extends over much of the door 60 but includes a cut away portion 72 which exposes a portion of the inner skin 66.

A drainage system 100 is shown adjacent to the inner skin 66 of the door 60 at the cutaway portion 72 of the honeycomb structure 70. The drainage system 100 includes a seal 102 and one or more drain tubes 104. As will be discussed in detail, the seal 102 is affixed at one side to the internal structure of the aircraft and while an opposite side of the seal 102 engages the inner side 66 of the outer skin 64 of the door 60 when the door is in the closed configuration. FIG. 4 shows the seal 102 engaging the door 60 in the closed position. The drain tubes 104 terminate within the seal 102, as will be discussed herein in further detail, and extend in an opposite direction away from the seal 102.

Figure 5:
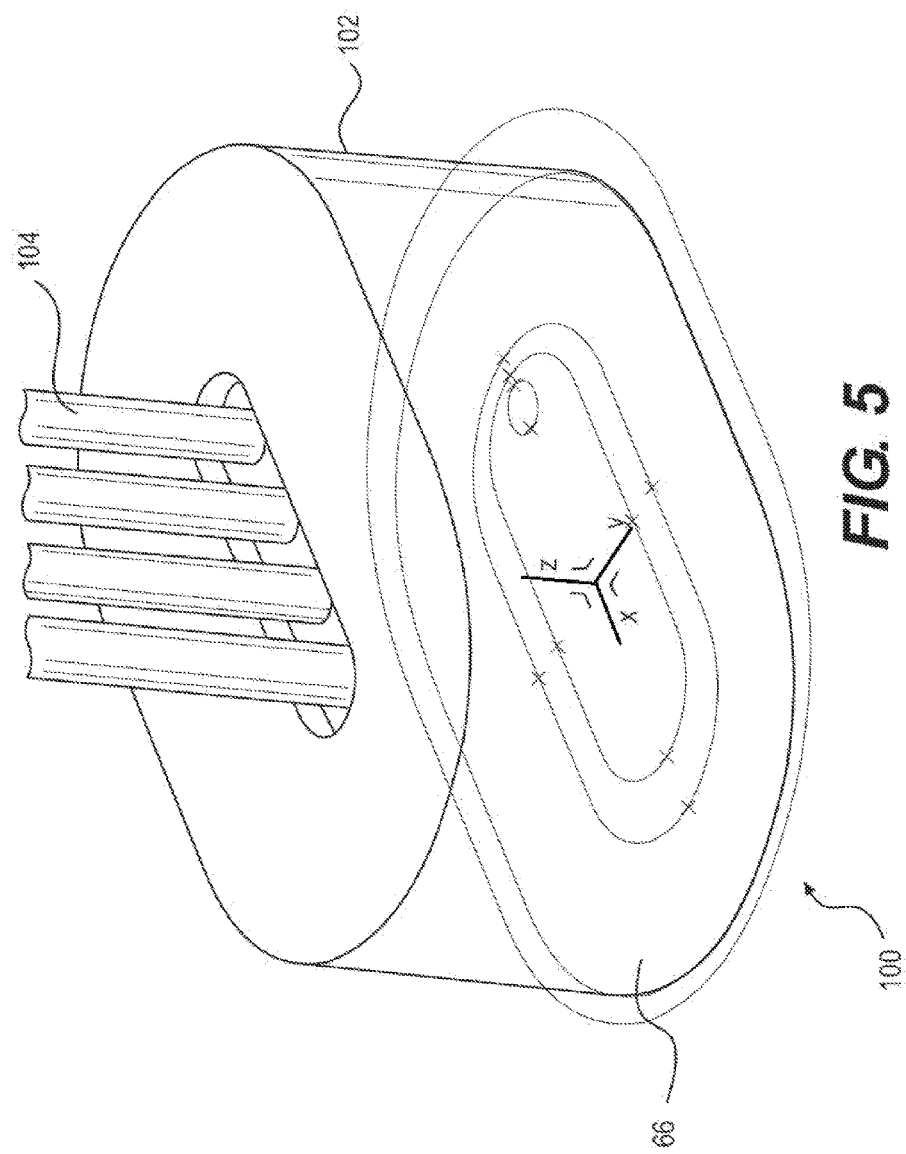
FIG. 5 is a perspective view of a drainage system according to one exemplary embodiment.

FIG. 5 shows an enlarged view of the drainage system 100. In this illustrative embodiment, four drain tubes 104 extend into the seal 102. However, the drainage system 100 may include more or less drain tubes 104 depending upon a specific application and requirements of the system 100.

Figure 6:
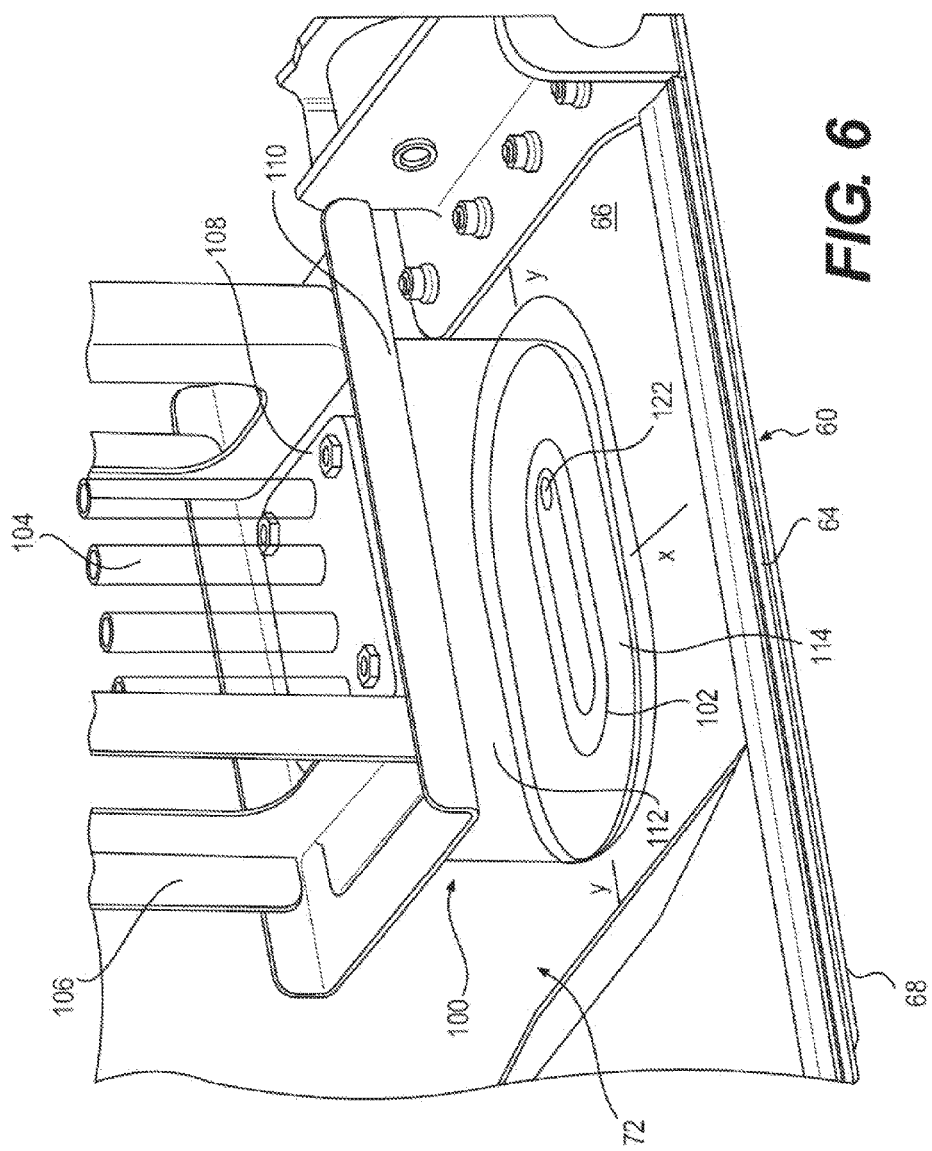
FIG. 6 is another perspective view thereof.
Figure 7:
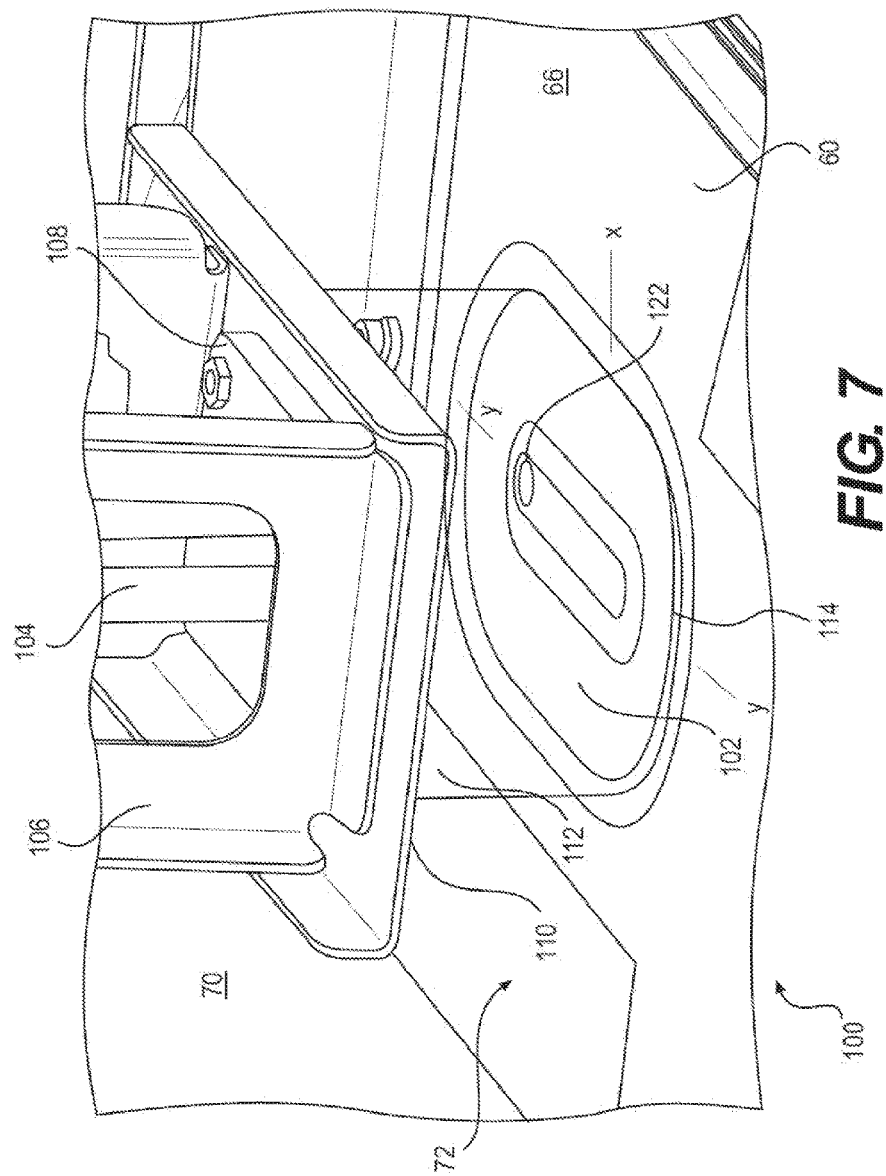
FIG. 7 is another perspective view thereof.

FIGS. 6-7 is an enlarged view of the drainage system 100 and a partial view of the door 60. As shown, the system 100 further includes a bracket 106 and a flange 108. The flange 108 receives and supports the drain tubes 104 in a generally vertical orientation. The flange 108 is mounted upon the bracket 106 which is connected to an interior structure of the aircraft. In the illustrated example, the bracket 106 is connected to the APU 58. The bracket 106 includes a mounting surface 110 upon which an upper side 112 of the seal 102 is fixedly mounted. As referenced above, a lower side 114 of the seal 104 is in contact with and engages the inner side 66 of the outer skin 64 of the door 60. When the door 60 is moved into the opened position, the lower side 114 of the seal 102 disengages from the door 60 thus allowing the door 60 to move to a location remote from the seal 102 and the drain tubes 104. When the door 60 is moved back into the closed position, the inner side 66 of the door 60 is brought proximate to the seal 102 such that the lower side 114 of the seal 102 contacts and, as discussed further herein, sealingly engages with the door 60.

Figure 8:
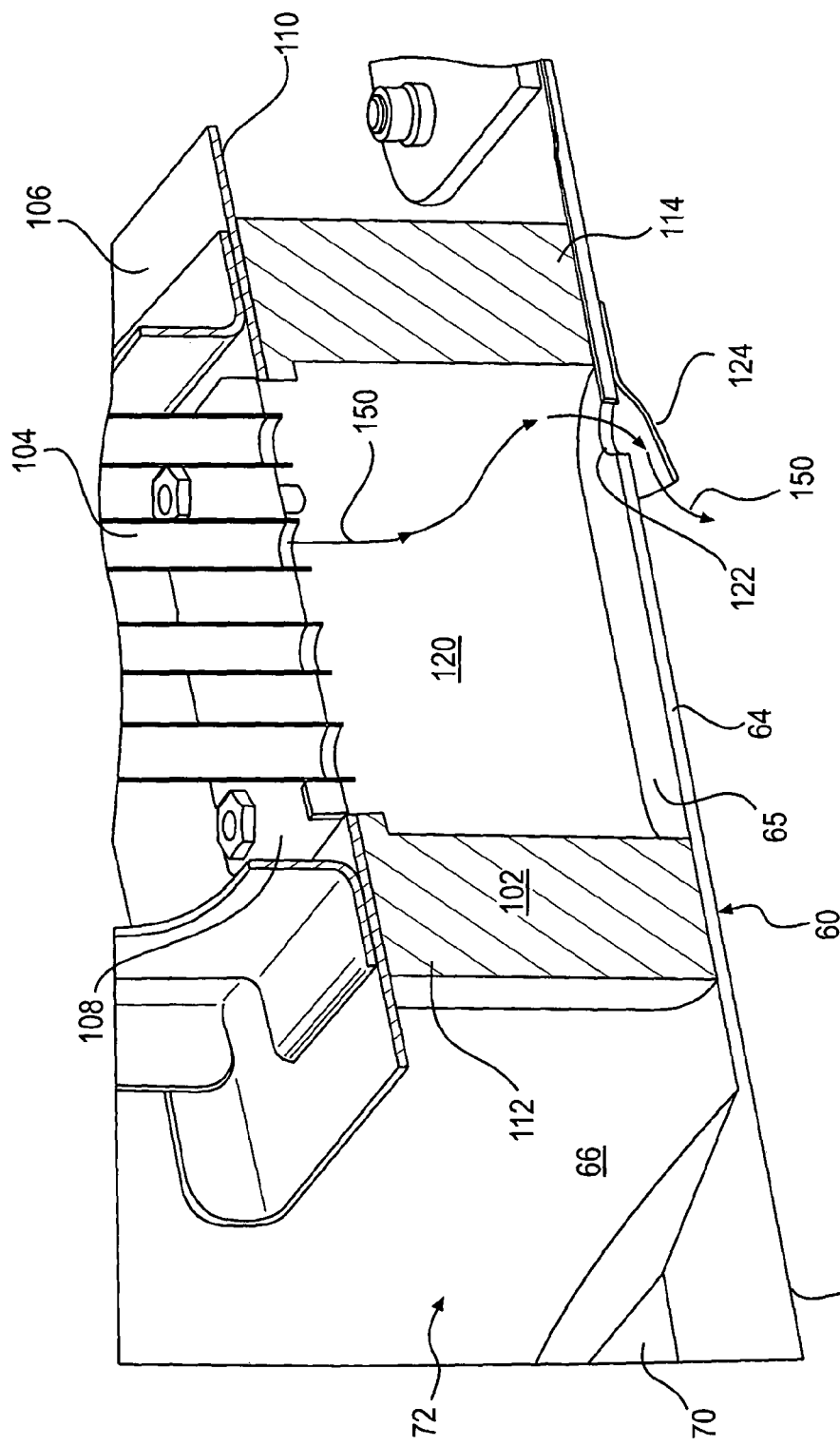
FIGS. 8-10 are various cross-sectional views thereof.
Figure 9:
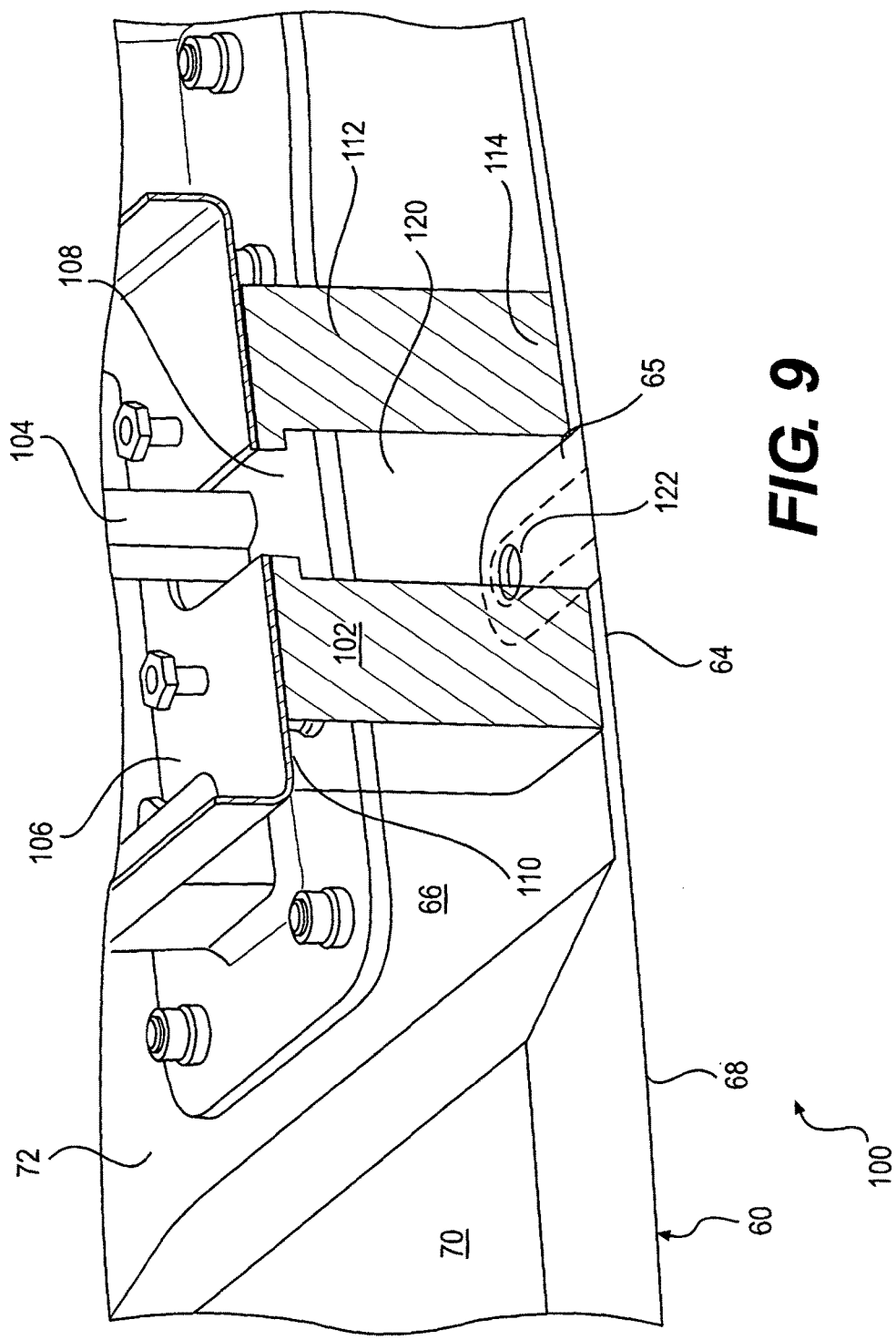

FIGS. 8 and 9 are cross-sectional views of the arrangement of FIGS. 6 and 7 taken along the axes Y-Y and X-X, respectively. As shown, the seal 102 delimits a cavity 120 at an interior of the seal 102. The cavity 120 extends through the seal 102 and is bounded at an upper region by the flange 108 and the drain tubes 104, and is further bounded at a lower region by the inner side 66 of the skin 64 of the APU access door 60. This holds when the door 60 is in the closed position, as illustrated. When the door 60 is moved to the open position, the lower side 114 of the seal disengages from the inner side 66 of the door 60 such that the door 60 is free to travel to a position away from the bracket 106, drain tubes 104, and seal 102. In this open position, the cavity 120 is open and exposed to the environment. As discussed above, when the door 60 is brought into the closed position, the seal 102 sealingly engages against the inner side 66 of the skin 64 of the door. In this closed position, the seal cavity 120 is hermetically sealed with respect to the remainder of the interior of the tail cone.

The drain tubes 104 extend through the flange 108 and through the bracket 106 into the cavity 120. The drain tubes terminate in the upper region of the cavity 120 proximate to the upper side 112 of the seal 102.

At the lower region of the cavity 120, the lower portion 114 of the seal is engaged against the outer skin 64 of the door 60. As such, a portion 65 of the inner side 66 of the door skin 64 is disposed within the cavity 120. A perforation 122 is formed in this portion 65 of the outer skin 64 of the door 60. The perforation 122 extends from the cavity 120, through the outer skin 64 of the door 60, to an exterior of the aircraft. In the exemplary illustrated embodiment, the perforation 122 is a hole having a circular shape. However, the perforation 122 may assume any desired shape suitable for a particular application of the drainage system 100. For example, the perforation may curvilinear shaped, rectilinear shaped, or a combination shape having both curvilinear and rectilinear features. In the illustrated embodiment, the system 100 includes a single perforation 122. In an alternate embodiment, the drainage system may include more than one perforation. Such multiple perforations can be similarly or differently shaped and they can be disposed proximate or distal to one another.

Where the cavity 120 includes a low point, the perforation(s) are preferably positioned proximate to such low point. For example, where the aircraft outer skin 64 is angled relative to a vertical axis of the aircraft and the drainage system is disposed at such angled outer skin 64, a low point is created within the cavity. In such situation, the seal 102 is affixed perpendicularly to the angled outer skin 64, as shown in the drawings, thus the cavity itself will be angled and will likely include an area which is lower on the vertical axis than other areas within the cavity. The perforation is preferably disposed within this low area to facilitate gravity induced drainage of any fluids within the cavity 120.

A scupper flange 124 is disposed at the exterior of the aircraft on the outer side 68 of the skin 64 of the door 60 proximate to the perforation 122. The scupper flange 124 extends over the perforation 122 and serves to direct expelled fluid in a predetermined direction at the exterior of the aircraft. Also, the scupper flange 124 serves to cover the perforation 122 and protect the cavity 120 and the remainder of the drainage system 100 from lightning which may occur at the exterior of the aircraft. That is, the scupper flange, preferably made of carbon fiber or a similar material, blocks the perforation 122 and the cavity 120 and thus prevents a lightning strike from entering.

Figure 10:
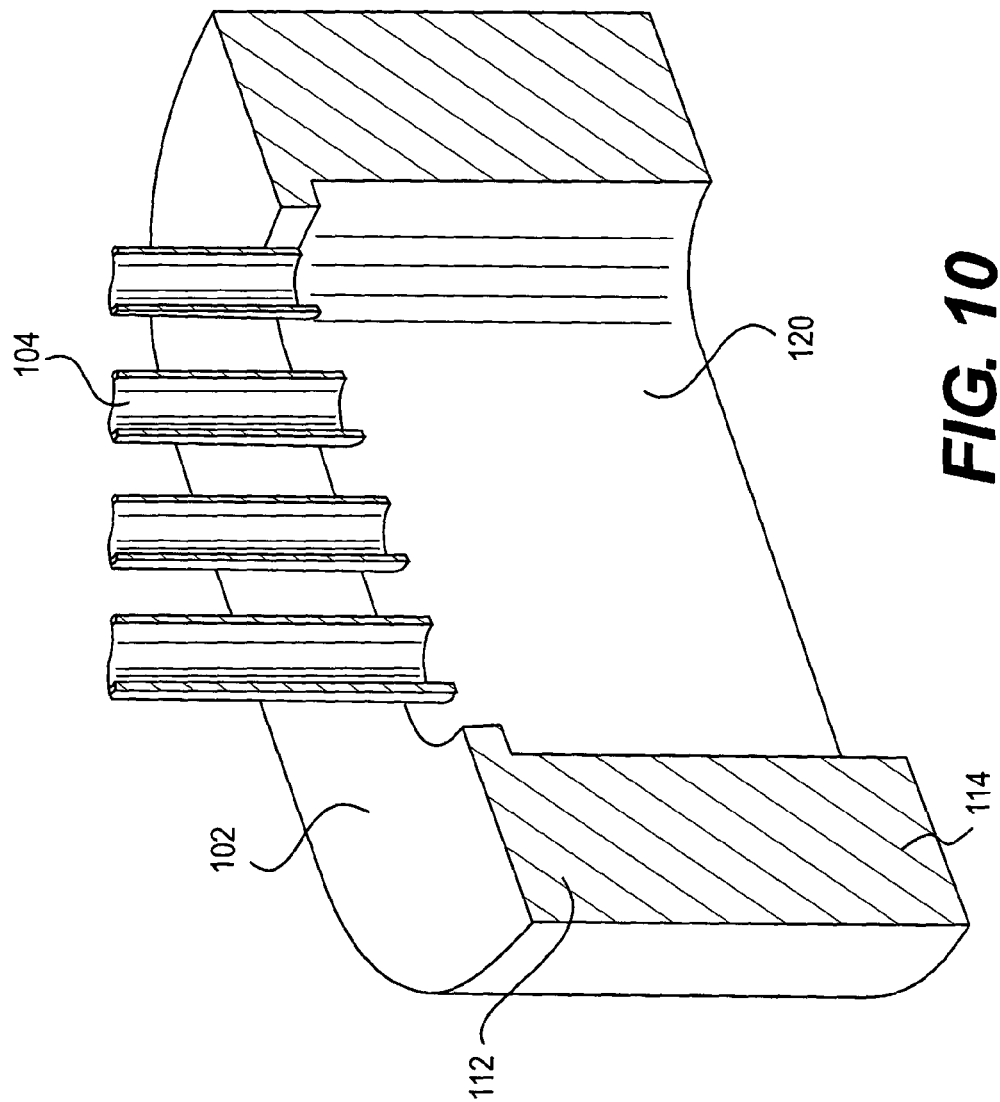

FIG. 10 shows another cross-sectional view of the seal 102 and drain tubes 104 in isolation. The exemplary contour and shape of the seal 102 and of the corresponding cavity 120 are illustrated.

As mentioned, the drain tubes 104 of the drainage system 100 terminate at one end in the cavity 120. The drain tubes 104 extend away from the seal 102 within the aircraft interior and terminate at opposite second ends at an aircraft system or component that is susceptible to fluid leakage or accumulation which requires periodic drainage. In the illustrated example, the drain tubes 104 extend to and are in fluid communication with various components of the APU 58. For example, the drain tubes may extend to one or more of the APU inlet plenum drain, the fuel control drain, the bearing seal witness drain, and the turbine plenum drain. When fluid enters the drain tubes 104, it is fed by gravity to the terminal ends of the drain tubes 104 disposed within the cavity 120 within the seal 102. The fluid descends from the terminal ends of the drain tubes 104, and flows downward through the cavity 120 to the area 65 of the inner side 66 of the outer skin 66 of the door 60. As discussed, the perforation 122 is formed at a low point of this area 65. Therefore, the leaked fluid is drawn by gravity into the perforation 122, through the outer skin 64 of the door 60, and into and through the scupper flange 124 from where it is expelled into the atmosphere. Of course, this scenario is with the door in the closed position. With the door in the open position, assuming the aircraft is grounded, liquid descending from the drain tubes 104 would simply fall from the tail cone to the ground.

In the illustrated embodiment, the seal 102 has an oval cross-section and thus the delimited cavity 120 possesses a correspondingly ovoid shape. This is merely exemplary, however. The seal 102 can assume any cross-sectional shape suitable for receiving the drain tubes 104, for extending to and engaging with the door 60, and for surrounding the perforation 122.

Figure 11:
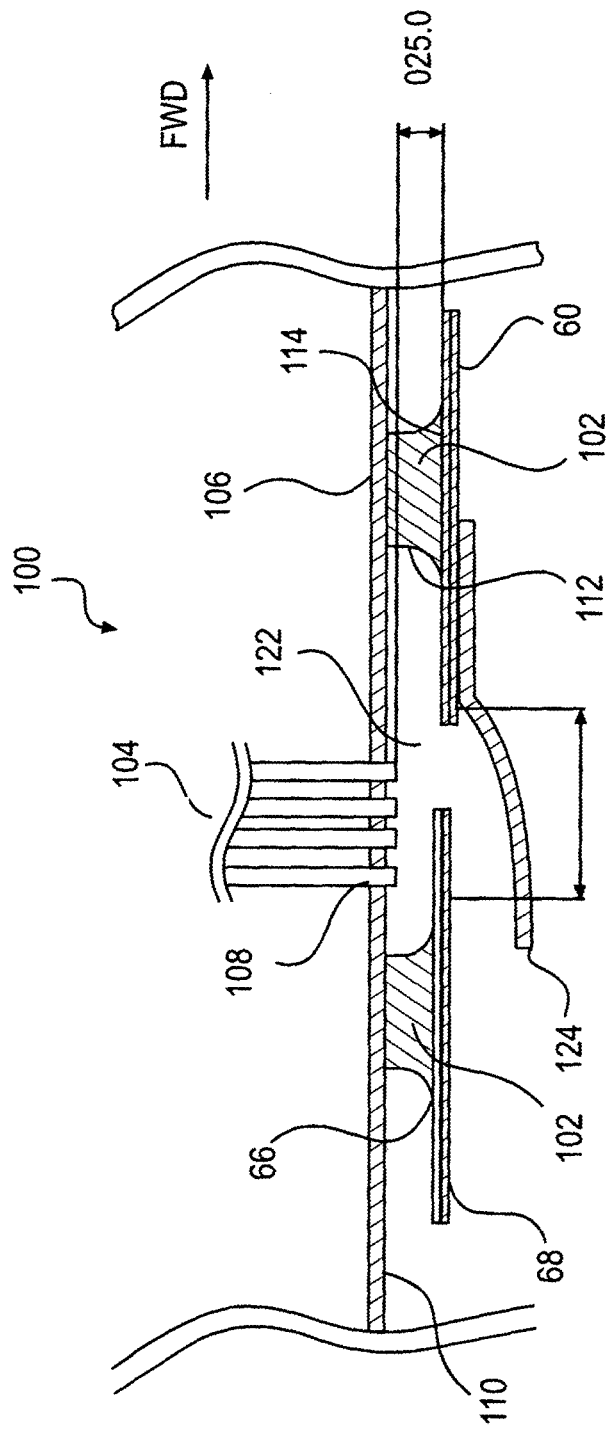
FIG. 11 is a schematic cross sectional view of the drainage system of FIG. 6.

The seal 102, in the instant embodiment, is formed of a flexible material and is configured to absorb movement of the bracket 106 and APU 58 relative to the aircraft outer skin 64 and, vice versa, movement of the outer skin 64 relative to the interior components of the drainage system 100. FIG. 11 is a schematic cross-section of the drainage system 100 in which the lower side 114 of the seal 102 is compressed against the door 60. This compression may be a result of the relative motion described above.

Additionally and/or alternatively, the seal 102 may further be formed of a fire resistant material.

As discussed herein, the seal 102 is affixed at the upper side 112 to the mounting surface 110 of the bracket 106. The seal 102 extends from the bracket 106 toward the APU access door 60 and includes the freely extending lower end 114 which, in the closed position, contacts and seals against the inner side 66 of the door skin 64. In this configuration, the seal is not affixed to the door 60, but instead the lower side 114 of the seal 102 sealingly engages the seal surface inner side 66 to hermetically seal the cavity 120 when the door 60 is closed. When the door is moved into the opened position, the engagement of the seal 102 and the door 60 is broken and the cavity 120 is exposed.

In alternate embodiment, the lower side 114 of the seal 102 is affixed to the inner side 66 of the outer skin 64 of the door 60. In this configuration, the upper side 112 of the seal 102 extends freely towards the bracket 106 which, in this embodiment, includes a sealing surface 110. In the closed position, the upper side 112 of the seal 102 contacts and sealingly engages the sealing surface 110 of the bracket to thus form and hermetically seal the cavity 120. When the door is moved to the open position, the upper side 112 of the seal 102 disengages the bracket 106 and, because the seal 102 is affixed to the door 60, the seal travels with the door 60 as it moves away from the bracket 106 and drain tubes 104 into the open position.

The drainage system 100 creates a drainage pathway 150 as illustrated in FIG. 8. The pathway 150 extends from the drain tubes 104, into and through the cavity 120, into the perforation 122 and through the outer skin 64 of the aircraft, and finally into the scupper flange 124 from which the fluid is expelled into the atmosphere. The fluid is driven along the pathway by gravity and perhaps by a pressure differential created between the stationary air within the cavity and the moving air at the exterior of the aircraft passing around the scupper flange 124. The drainage pathway 150 is suited for fluid movement only in the direction described, fluid may not move in the opposite direction of the described fluid pathway 150.

As described, the fluid pathway 150 is suitable for fluid flow but is not a suitable pathway for lightning or movement of lightning energy. The scoop flange 124 inhibits entry of lightning into the cavity 120. Moreover, the described pathway 150 does not provide any direct pathway for lightning to travel into the aircraft. That is, the seal is an elastic, fire-resistant, non-conductive material which does not offer a pathway for lightning. Furthermore, metallic conductive items such as the bracket 106 and drain tubes 104 are disposed at a distance from the outer skin 64 of the aircraft and from the perforation 122 formed therein. Thus, even if lightning somehow penetrated the cavity 122 or attached to a fluid droplet in scupper flange 124, further movement of the lightning within the aircraft would be inhibited.

The illustrated embodiment of the aircraft drainage system 100 is described as being disposed at the tail cone of the aircraft to provide drainage to the APU 58. This is merely exemplary. The system 100 may be utilized at a variety of locations across the aircraft. More specifically, the drainage system 100 may be used at any location on the aircraft where drainage of flammable or non-flammable fluids is desired, and particularly in areas susceptible to lightning exposure.

As used herein the terms "comprising" (also "comprises," etc.), "having," and "including" is inclusive (open-ended) and does not exclude additional, unrecited elements or method steps. The singular forms "a," "an," and "the" include plural referents unless the context clearly dictates otherwise. The term "or" means "and/or." Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A drain for expelling fluids from an interior of an aircraft to an exterior of the aircraft, the drain comprising:
   a drain tube disposed at the interior of the aircraft having a first end disposed in fluid communication with an aircraft equipment to be drained and an opposite second end, wherein the drain tube terminates at the second end at a location within the interior of the aircraft;
   a seal which extends between the second end of the drain tube and an inner side of an outer skin of the aircraft, delimiting a drainage cavity; and
   a perforation in the outer skin that extends from the cavity through the outer skin to the exterior of the aircraft;
   wherein: fluid from the drain tube enters the drainage cavity and passes directly from the drainage cavity, through the perforation in the outer skin to the exterior of the aircraft; and the seal sealingly surrounds a portion of the inner side of the outer skin through which the perforation extends.

2. The drain of claim 1, wherein the seal is composed of a fire resistant material and sealingly surrounds the second end of the drain tube.

3. The drain of claim 2, wherein the outer skin which contacts the seal constitutes a portion of a movable door of the aircraft, wherein the door is movable between an open position and a closed position, wherein in the closed position the cavity is hermetically sealed, and wherein in the open position the cavity is exposed to the exterior of the aircraft.

4. The drain of claim 3, wherein the seal is affixed at a first end to the interior of the aircraft, the seal including an opposite second end which freely extends from the interior of the aircraft to contact the outer skin.

5. The drain of claim 4, wherein in the closed position the outer skin of the door contacts and seals against the free second end of the seal to delimit the cavity, and wherein in the open position the outer skin is positioned away from the seal and the cavity is exposed to the exterior of the aircraft.

6. The drain of claim 5, wherein the equipment to be drained comprises an auxiliary power unit (APU) disposed in a tail cone of the aircraft, the drain further comprising a bracket affixed to the first end of the seal and connected to the APU.

7. The drain of claim 3, wherein the seal includes a second end affixed to a portion of the door and a first free end which extends freely toward the second end of the drain tube.

8. The drain of claim 7, wherein in the closed position the first free end of the seal is disposed proximate to the second end of the drain tube and hermetically seals the cavity, and wherein in the open position the door and the seal are positioned away from the drain tube and the cavity is exposed to the exterior of the aircraft.

9. The drain of claim 8, wherein the equipment to be drained comprises an auxiliary power unit (APU) disposed in a tail cone of the aircraft, the drain further comprising a bracket supporting the second end of the drain tube and including a sealing surface against which the seal contacts when the door is in the closed position.

10. The drain of claim 1, further comprising a non-conductive flange disposed over the perforation on the exterior of the aircraft, the flange being configured to cover the perforation at the exterior of the aircraft to prevent lightning from entering the cavity.

11. The drain of claim 1, wherein the aircraft equipment comprises an auxiliary power unit disposed in a tail cone of the aircraft.

12. The drain of claim 11, wherein the perforation extends through an inclined portion of the outer skin of the tail cone at a relative low point of the inclined portion of the outer skin to facilitate a gravity driven drainage of fluid from the cavity through the perforation to the exterior of the aircraft.

13. The drain of claim 12, wherein a flange is disposed at the exterior of the aircraft over the perforation, the flange being configured to cover the perforation at the exterior of the aircraft to prevent lightning from entering the cavity.

14. The drain of claim 1, wherein the opposite second end of the drain tube is disposed at an upper end of the cavity and the seal extends downwardly to the outer skin located at a bottom of the cavity such that fluid passing from the drainage tube into the cavity is gravity fed through the cavity to the outer skin and to the perforation extending through the outer skin.

15. The drain of claim 14, wherein the outer skin is angled relative to a vertical axis of the aircraft, and wherein the perforation is disposed in a relative low point of the angled outer skin within the cavity.

16. The drain of claim 1, wherein the seal is composed of a flexible material configured to absorb movement of structures at the interior of the aircraft relative to movement of the outer skin.

17. A drainage system for an aircraft auxiliary power unit (APU) disposed in a tail cone of an aircraft, the drainage system comprising:
   a drain tube having a first end disposed in fluid communication with the APU and configured to receive excess fluid from the APU, the drain tube further including an opposite second end, wherein the drain tube terminates at the second end at a location within the tail cone above a lower angled outer skin of the tail cone;
   a seal which surrounds and seals the second end of the drain tube, wherein the seal extends downwardly to the angled outer skin of the tail cone and seals thereagainst, delimiting a hermetically sealed drainage cavity;
   a perforation extending through the angled outer skin to an exterior of the aircraft; and
   a flange disposed on the outer skin at the exterior of the aircraft and extending over the perforation, the flange being configured to direct drained fluid at the exterior of the aircraft and to cover the perforation at the exterior of the aircraft to prevent lightning from entering the cavity;
   wherein: the perforation is disposed in the angled outer skin at a relative low point of the cavity to facilitate gravity fed drainage of the fluid therethrough; and the seal sealingly surrounds a portion of an inner side of the angled outer skin through which the perforation extends.

18. The drainage system of claim 17, wherein the angled outer skin comprises a portion of an APU access door which is movable between an open position and a closed position such that in the closed position the cavity is hermetically sealed and in the open position the cavity is exposed to the exterior of the aircraft, wherein the seal is affixed at a first end to a bracket which supports the drain tube and which is affixed to the APU, wherein the seal includes an opposite second end which freely extends from the bracket to contact and hermetically seal with the angled outer skin when the door is in the closed position.

19. The drainage system of claim 18, wherein the seal is composed of a flexible material configured to absorb movement of bracket and the APU relative to movement of the outer skin, and wherein the fluid comprises a flammable liquid.

* * * * *